United States Patent [19]

Binder et al.

[11] Patent Number: 6,076,897
[45] Date of Patent: Jun. 20, 2000

[54] VEHICLE POWER BRAKE SYSTEM INCLUDING A MOTOR DRIVEN HYDRAULIC PUMP

[75] Inventors: Juergen Binder, Stuttgart; Martin Pfau, Weissach; Eberhardt Schunck, Landau; Andreas Kaessmann, Gerlingen, all of Germany

[73] Assignee: Robert Bosch GmbH, Stuttgart, Germany

[21] Appl. No.: 08/925,488

[22] Filed: Sep. 8, 1997

[30] Foreign Application Priority Data

Sep. 7, 1996 [DE] Germany .................. 196 36 432

[51] Int. Cl.⁷ ................................................ B60T 8/40
[52] U.S. Cl. ................................... 303/116.1; 303/115.4
[58] Field of Search ..................... 303/10, 11, 115.4, 303/116.1, 116.2, 125

[56] References Cited

U.S. PATENT DOCUMENTS 5,013,096  5/1991  Ocvirk et al. ................... 303/116.1
5,207,485  5/1993  Troster ............................. 303/116.1
5,348,381  9/1994  Bernhardt et al. ............... 303/116.1

FOREIGN PATENT DOCUMENTS 0 280 740 B1   10/1994   European Pat. Off. .
WO95/14595      6/1995   WIPO .
WO 96/18531     6/1996   WIPO .

Primary Examiner—Robert J. Oberleitner
Assistant Examiner—Mariano Sy
Attorney, Agent, or Firm—Ronald E. Greigg; Edwin E. Greigg

[57] ABSTRACT

The invention relates to a hydraulic motor vehicle power brake system having a hydraulic pump which is connected to a hydraulic reservoir as an external energy reservoir and is connected to wheel brake cylinders, wherein the wheel brake cylinders are preceded by inlet valves and are followed by outlet valves. To improve the adjustability of a desired brake pressure in the wheel brake cylinders and to cut costs, the inlet and outlet valves are identical as continuous pressure limiting solenoid valves or as continuous pressure differential solenoid valves.

20 Claims, 1 Drawing Sheet

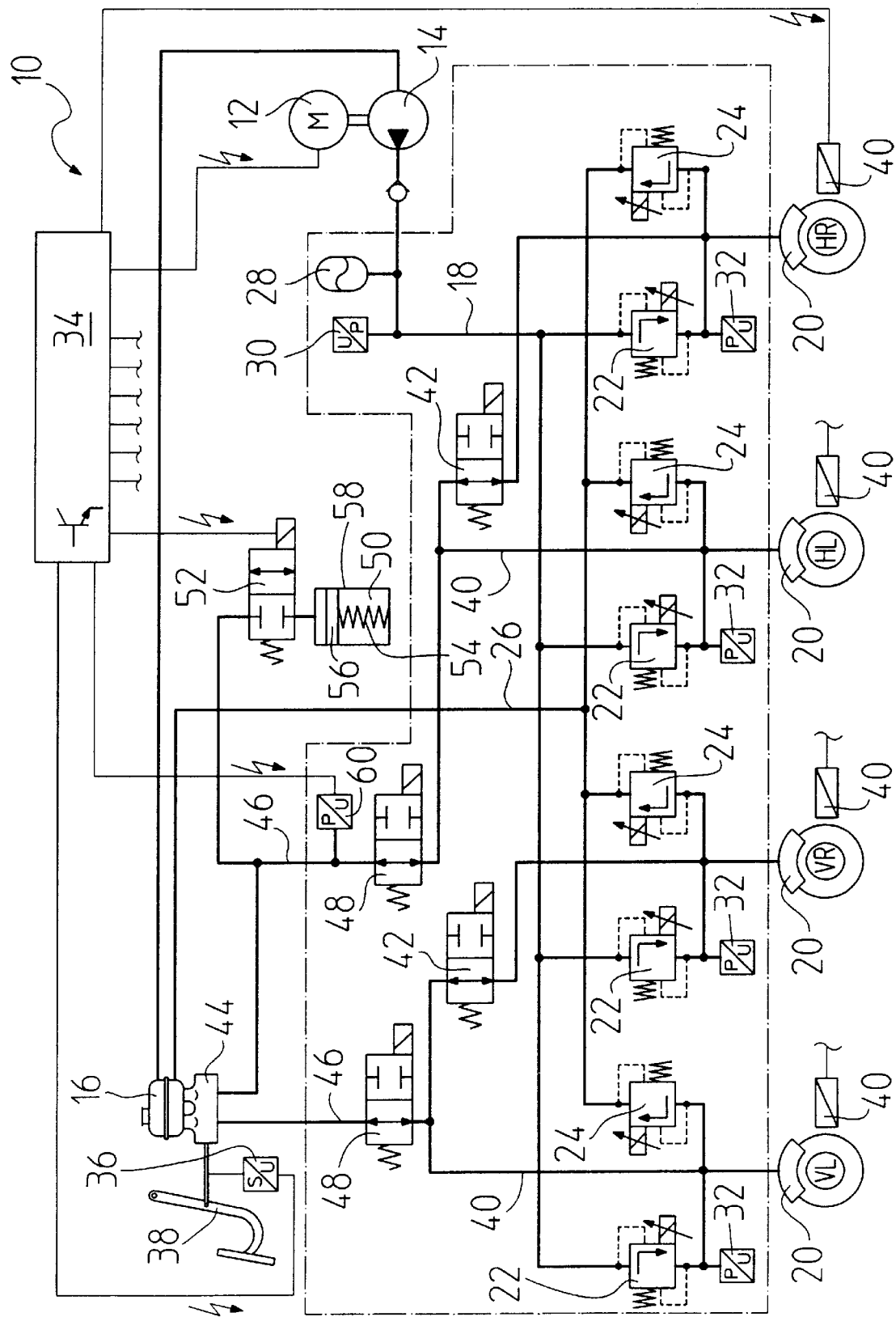

VEHICLE POWER BRAKE SYSTEM INCLUDING A MOTOR DRIVEN HYDRAULIC PUMP

BACKGROUND OF THE INVENTION

The invention is based on a vehicle power brake system including a motor driven hydraulic pump.

A motor vehicle brake system of this kind is described in DE 195 48 207. This motor vehicle brake system has a hydraulic pump that can be driven with an electrical pump motor to build up a brake fluid pressure for power braking. The hydraulic pump aspirates from a brake fluid reservoir. A pressure side of the hydraulic pump is connected to wheel brake cylinders, each of which is preceded by a solenoid inlet valve that is closed in its normal position. Furthermore, each wheel brake cylinder is followed by a solenoid outlet valve that is open in its normal position and is connected to the brake fluid reservoir. The solenoid valves are triggered by an electronic control device, which receives an input signal from a for example pedal-actuated brake power set-point transmitter and from brake pressure sensors connected to the wheel brake cylinders.

To increase pressure in the wheel brake cylinders, the outlet valve is closed and the inlet valve is opened until a brake pressure is adjusted in the wheel brake cylinders that is a function of the signal of the brake power set-point transmitter. To reduce the pressure in the wheel brake cylinders, the outlet valve is opened.

In addition to its function for adjusting the brake pressure in the wheel brake cylinders, the inlet valve has a safety function: if the brake fluid pressure exceeds a permissible maximum pressure due to a malfunction of the electronic control device or of a pump pressure sensor connected to the pressure side of the hydraulic pump, then the inlet valve, which closes by means of a spring force, opens so that brake fluid flows from the pressure side of the hydraulic pump, through the inlet valve and the outlet valve, which is open in its normal position, back into the brake fluid reservoir so that the maximum pressure in the motor vehicle brake system is limited. No brake pressure is built up in the wheel brake cylinder.

OBJECT AND SUMMARY OF THE INVENTION

The inlet and outlet valves of the hydraulic motor vehicle power brake system according to the invention are embodied identically. This has the advantage of a larger production number of the same valves and a lower number of valves of different types, which brings cost advantages. Another advantage is a reduced frequency of assembly errors since the identical embodiment of the inlet and outlet valves prevents them from being inadvertently switched during assembly.

Furthermore, the inlet and outlet valves of the motor vehicle brake system according to the invention are embodied as pressure limiting valves or pressure differential valves so that the inlet valves are used as safety valves, which limit the brake fluid pressure on the pressure side of the hydraulic pump to a permissible maximum pressure and as a result, protect the motor vehicle brake system from damage.

Advantageous improvements of the vehicle power brake system are set forth hereinafter.

Preferably, the inlet and outlet valves are embodied as continuous valves whose through flow cross section is a function of their control current or exciter current, which therefore throttle the fluid through flow as a function of their power supply. This has the advantage that the pressures in the wheel brake cylinders can be adjusted in a finely metered manner. Furthermore when opening the valves, an abrupt development of a brake fluid flow is prevented and when closing them, an abrupt interruption of the brake fluid flow is prevented, both of which would cause erratic pressure changes. Erratic pressure changes of this kind lead to undesirable generation of noise, put considerable strain on the motor vehicle brake system due to pressure peaks, and impair the regulating quality of the wheel brake cylinder pressure when braking.

The invention will be better understood and further objects and advantages thereof will become more apparent from the ensuing detailed description of preferred embodiments taken in conjunction with the drawing.

BRIEF DESCRIPTION OF THE DRAWING

The sole FIGURE shows the hydraulic circuit diagram of a motor vehicle brake system according to the invention.

DESCRIPTION OF THE PREFERRED EMBODIMENTS

The motor vehicle power brake system 10 according to the invention, shown in the drawing, has a hydraulic pump 14, which can be driven with an electric pump motor 12 and whose suction side is connected to a brake fluid reservoir 16. A pressure side of the hydraulic pump 14 is connected via a branching main brake line 18 which is connected to each of is four wheel brake cylinders 20, each of which is preceded by a normally closed inlet valve 22. Each wheel brake cylinder 20 is followed by a normally closed outlet valve 24, from which a common return line 26 leads back to the brake fluid reservoir 16. The inlet valves 22 and the outlet valves 24 are identically embodied as continuous pressure differential solenoid valves. Each of the inlet valves 22 and each of the outlet valves 24 are normally closes by prestressed closing springs 21, each of which have the same closing force. They can be replaced by continuous pressure limiting solenoid valves, not shown.

Furthermore, the motor vehicle brake system 10 according to the invention has an external energy reservoir 28, which is connected to the pressure side of the hydraulic pump 14 and is embodied as a hydraulic fluid reservoir, a pump pressure sensor 30 is likewise-connected to the pressure side of the hydraulic pump 14, as well as brake pressure sensors 32 which are connected to each wheel brake cylinder 20.

The triggering of the pump motor 12 as well as the inlet and outlet valves 22, 24 is carried out with an electronic control device 34 that receives signals from the pump pressure sensor 30, the brake pressure sensors 32, and a brake power set-point transmitter 36 that can be adjusted with a brake pedal 38.

Function of the Motor Vehicle Power Brake System According to the Invention

The hydraulic pump 14 supplies brake fluid into the external energy reservoir 28 until the pressure measured with the pump pressure sensor 30 reaches a maximal pressure that lies below a permissible maximum pressure of the motor vehicle brake system 10. When the maximal pressure is reached, the hydraulic pump 14 is switched off. If the pressure in the external energy reservoir 28 falls below a minimal pressure that assures a sufficient brake power when the inlet valves 22 are open, then the hydraulic pump 14 is switched on again and the external energy reservoir 28 is filled again up to the maximal pressure.

The hydraulic pump 14 is therefore used to recharge the external energy reservoir 28, which continually supplies brake fluid under a sufficient pressure for braking. The external energy reservoir 28 has the advantage that pressurized brake fluid for braking is immediately available on a continuous basis, that is, even when the hydraulic pump 14 is switched off. Another advantage is that the brake fluid pressure is relatively steady and pressure fluctuations and pressure peaks are reduced. Pressure fluctuations when supplying brake fluid, which arise due to the design of the hydraulic pump 14, are likewise compensated for.

In their currentless normal position, the inlet valves 22 divide the wheel brake cylinders 20 off from the external energy reservoir 28. If a brake power increase is requested by adjusting the brake power set-point transmitter 36, the inlet valves 22 are supplied with current and consequently pressure builds up in the wheel brake cylinders 20. The pressure in the wheel brake cylinders 20 is measured using the brake pressure sensors 32 connected to them and, by means of the inlet and outlet valves 22, 24, which are embodied as continuous valves, this pressure is adjusted to a value that is a function of the signal of the brake power set-point transmitter 36, wherein the brake pressure in each wheel brake cylinder 20 can be adjusted individually. Preferably, the pressure in the wheel brake cylinders 20 of one vehicle axle are the same and can be adjusted individually for each vehicle axle depending on conditions.

The inlet valves 22 which, like the outlet valves 24, are embodied as pressure differential valves or pressure limiting valves, have a safety function in addition to their function of adjusting the wheel brake cylinder pressure: they are designed so that they open when a pressure differential acting on them or the pressure on their inlet side reaches a permissible maximum pressure of the motor vehicle brake system. It is assured that the pressure in the motor vehicle brake system 10 does not exceed the permissible maximum pressure when, due to a malfunction in the electronic control device 34 or the pump pressure sensor 30, the hydraulic pump 14 continues to feed after the maximal pressure is achieved, at which point it is normally switched off.

If one of the inlet valves 22 opens because the permissible maximum pressure has been reached, the outlet valve 24 is opened by being supplied with power in order to prevent brake pressure from building up in the wheel brake cylinder 20, i.e. in order to not brake the respective wheel of the vehicle. The opening of the outlet valve 24 occurs automatically by virtue of the fact that the brake pressure sensor 32 detects a pressure increase in the wheel brake cylinder 20 and this is not countered by any brake power increase being requested by the brake power set-point transmitter 36. A second possibility is to open the outlet valves 24 by supplying them with power continuously as long as the brake power set-point transmitter 36 does not request any brake power increase.

Slip Regulation Device

The motor vehicle power brake system 10 according to the invention has wheel rotation sensors 40' whose signals are supplied to the electronic control device 34. If a tendency to lock occurs in a vehicle wheel when braking or if slippage occurs when accelerating, which the electronic control device 34 detects by means of the wheel rotation sensors 40', a brake pressure modulation takes place in a manner that is known per se through the triggering of the inlet and outlet valve 22, 24 of the wheel brake cylinder 20 of the vehicle wheel affected.

The wheel brake cylinders 20 of the vehicle wheels of one vehicle axle are connected to each other via a connecting line 40 in which a connecting valve 42 is disposed. The connecting valve 42 is a 2/2-way solenoid valve that is open in its normal position and is likewise triggered by the electronic control device 34. First, the connecting line 40 has the advantage that the same pressure is set in the wheel brake cylinders 20 of the vehicle wheels of one vehicle axle and permits an axle by axle pressure increase in the wheel brake cylinders 20 with only one inlet valve 22 and one outlet valve 24. The brake pressure in the wheel brake cylinders 20 can thus be very finely metered. It is also advantageous that despite the failure of one inlet or outlet valve 22, 24, both vehicle wheels of a vehicle axle can be braked with the inlet and outlet valve 22, 24 of the wheel brake cylinder 20 of the other vehicle wheel of this vehicle axle. The operational safety of the motor vehicle brake system 10 according to the invention is therefore increased. For the purpose of slip regulation, the connecting valve 42 is closed so that an individual wheel pressure modulation can take place in the wheel brake cylinders 20.

Auxiliary Brake Device

In addition to its described service brake device, the motor vehicle brake system 10 is additionally equipped with an auxiliary brake device. It has a two-circuit master cylinder 44 that can be actuated with the pedal 38 and is used to adjust the brake power set-point transmitter 36. The brake fluid reservoir 16 is mounted on the master cylinder 44.

Therefore, a conventional two-circuit master cylinder 44 is used, which has a mounted brake fluid reservoir 16 and is actuated with the pedal 38, that is, a subassembly of the kind installed in a multitude of motor vehicles. The brake power set-point transmitter 36 derives a brake power set-point from the position of the pedal 38. The master cylinder 44 can be equipped with a brake booster that is known per se and is not shown in the drawing. Also, a single circuit master brake (not shown) is sufficient for the auxiliary brake device.

An auxiliary brake line 46 leads from each of the two brake circuits of the master cylinder 44 to the connecting line 40 of the wheel brake cylinders 20 of the vehicle wheels of the front axle shown on the left in the drawing or of the rear axle shown on the right in the drawing, that is, the vehicle wheels of the front axle are connected to the one brake circuit and the vehicle wheels of the rear axle are connected to the other.

A block valve 48 is disposed in each of the auxiliary brake lines 46. The block valve 48 is a 2/2-way solenoid valve that is open in its normal position. This valve is closed when the above-described power service brake device is used for braking, i.e. the master cylinder 44 is divided off from the wheel brake cylinders 20, that is, does not affect the power service braking. In order to achieve a normal power-to-path ratio of the pedal 38 when the block valves 48 are closed, i.e. in order give the driver the usual pedal behavior when braking and at the same time, in order to be able to adjust the brake power set-point transmitter 36 with the pedal 38, a pedal path simulator 50 that is known per se is connected via a simulator valve 52 to a brake circuit of the master cylinder 44. The simulator valve 52 is a 2/2-way solenoid valve that is closed in its normal position and is opened by the electronic control device 34 when the power service brake device is used for braking. The pedal path simulator 50 has a piston 56 loaded in a cylinder 58 by a spring 54. When the master cylinder 44 is actuated and the simulator valve 52 is opened, brake fluid flows into the pedal path simulator 50 so that the pedal 38 can be pressed downward. The spring 54 produces a pressure in the brake fluid, which rises as the spring 54 is increasingly compressed so that the power for pressing the pedal 38 downward increases continuously, as is usually the case with muscle-powered or power-assisted braking.

If there is a failure of the power brake device, the block valves 48 interposed between the master cylinder 44 and the wheel brake cylinders 20 reach their open normal position, just like the connecting valves 42 disposed in the connecting lines 40, so that the wheel brake cylinders 20 communicate with the master cylinder 44. The simulation valve 52 reaches its closed normal position so that the pedal path simulator 50 is divided from the main brake cylinder 44. The braking with the auxiliary brake device is carried out actuated by muscle power, possibly with power assist supported by a brake booster, by means of pressing down on the pedal 38.

The master cylinder 44 is connected to a pressure sensor 60, whose signal is supplied to the electronic control device 34. This can be used in addition to or in lieu of the brake power set-point transmitter 36 for adjusting the pressure in the wheel brake cylinders 20 when braking using the power service brake device.

The connecting line 40 between the wheel brake cylinders 20 of the vehicle wheels of one vehicle axle brings the advantage of a favorable potential for connecting the auxiliary brake device. The advantage of the connecting line 40 and auxiliary brake line 46 that connect the wheel brake cylinders 20 to the master cylinder 44 is the indirect connection of the wheel brake cylinders 20 to the brake fluid reservoir 16 via the master cylinder 44. As a result, brake fluid, which in the safety function of the inlet valve 22, when this valve opens upon the achievement of the permissible maximum pressure on the pressure side of the hydraulic pump 14, can flow through the connecting line 40, if need be the open connecting valve 42, the open block valve 48, the auxiliary brake line 46, and the master cylinder 44, and back into the brake fluid reservoir 16, without the outlet valve 24 having to be actuated. That is, without the intervention of the electronic control device 34, undesirable pressure is reliably prevented from building up in the wheel brake cylinders 20. If the motor vehicle brake system 10 is provided without an auxiliary brake device and therefore without a master cylinder 44, the wheel brake cylinders 20 can also be connected directly to the brake fluid reservoir 16 via the connecting line 40 and the block valve 48, in order not to have to actuate the outlet valve 24 when the inlet valve 22 reacts in its safety function.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic motor vehicle power brake system, comprising a hydraulic pump whose suction side is connected to a brake fluid reservoir and whose pressure side is connected to front and rear wheel brake cylinders, via inlet valves (22) each wheel brake cylinder is preceded by an auxiliary brake line (46) via a normally open block valve (48) which connects directly with the brake cylinders, and outlet valves (24) that connect the wheel brake cylinders to the brake fluid reservoir, an electronic control device, which receives electrical control signals from an adjustable brake power set-point transmitter (36) and from brake pressure sensors connected to the wheel brake cylinders, said electronic control device triggers the inlet valves and the outlet valves so that a brake pressure is adjusted in the wheel brake cylinders that is a function of a signal of the brake power set-pointer transmitter, the inlet valves (22) and the outlet valves (24) are identically embodied pressure limiting solenoid valves or pressure differential solenoid valves, both said inlet valves (22) and said outlet valves (24) are normally closed by prestressed closing springs (21), each of said closing springs (21) having the same closing force.

2. A hydraulic motor vehicle power brake system according to claim 1, in which the inlet valves (22) and the outlet valves (24) are continuous valves.

3. A hydraulic motor vehicle power brake system according to claim 1, in which a hydraulic reservoir (28) is connected to the pressure side of the hydraulic pump (14).

4. A hydraulic motor vehicle power brake system according to claim 2, in which a hydraulic reservoir (28) is connected to the pressure side of the hydraulic pump (14).

5. A hydraulic motor vehicle power brake system according to claim 1, in which the motor vehicle brake system (10) has an auxiliary brake device with a master cylinder (44) which is connected to the wheel brake cylinders (20) with an interposition of said block valve (48).

6. A hydraulic motor vehicle power brake system according to claim 2, in which the motor vehicle brake system (10) has an auxiliary brake device with a master cylinder (44) which is connected to the wheel brake cylinders (20) with an interposition of said block valve 48.

7. A hydraulic motor vehicle power brake system according to claim 3, in which the motor vehicle brake system (10) has an auxiliary brake device with a master cylinder (44) which is connected to the wheel brake cylinders (20) with an interposition of said block valve (48).

8. A hydraulic motor vehicle power brake system according to claim 5, in which a pedal path simulator (50) is connected to the master cylinder (44).

9. A hydraulic motor vehicle power brake system according to claim 6, in which a pedal path simulator (50) is connected to the master cylinder (44).

10. A hydraulic motor vehicle power brake system according to claim 7, in which a pedal path simulator (50) is connected to the master cylinder (44).

11. A hydraulic motor vehicle power brake system according to claim 1, in which the system has a slip regulation device.

12. A hydraulic motor vehicle power brake system according to claim 2, in which the system has a slip regulation device.

13. A hydraulic motor vehicle power brake system according to claim 3, in which the system has a slip regulation device.

14. A hydraulic motor vehicle power brake system according to claim 5, in which the system has a slip regulation device.

15. A hydraulic motor vehicle power brake system, comprising a hydraulic pump whose suction side is connected to a brake fluid reservoir and whose pressure side is connected to front and rear wheel brake cylinders, wherein the wheel brake cylinders (20) of a vehicle axle are connected to each other via a connecting valve (42) and each wheel brake cylinder is preceded by an auxiliary valve, inlet valves, and outlet valves that connect the wheel brake cylinders to the brake fluid reservoir, an electronic control device, which receives electrical control signals from an adjustable brake power set-point transmitter and from brake pressure sensors connected to the wheel brake cylinders, said electronic control device triggers the inlet valves and the outlet valves so that a brake pressure is adjusted in the wheel brake cylinders that is a function of a signal of the brake power set-point transmitter, the inlet valves (22) and the outlet valves (24) are identically embodied pressure limiting solenoid valves or pressure differential solenoid valves.

16. A hydraulic motor vehicle power brake system according to claim 15, in which the motor vehicle brake system (10) has an auxiliary brake device with a master cylinder (44) which is connected to the wheel brake cylinders (20) with an interposition of said block valve 48.

17. A hydraulic motor vehicle power brake system according to claim 16, in which a pedal path simulator (50) is connected to the master cylinder (44).

18. A hydraulic motor vehicle power brake system according to claim 15, in which the system has a slip regulation device.

19. A hydraulic motor vehicle power brake system according to claim 15, in which the inlet valves (22) and the outlet valves (24) are continuous valves.

20. A hydraulic motor vehicle power brake system according to claim 15, in which a hydraulic reservoir (28) is connected to the pressure side of the hydraulic pump (14).

* * * * *